(12) United States Patent
Fields

(10) Patent No.: US 6,408,137 B1
(45) Date of Patent: Jun. 18, 2002

(54) DUAL FILM IMAGE AND ELECTRONIC IMAGE CAPTURE CAMERA CAPABLE OF SELECTING FILM IMAGES TO BE COMBINED IN A SINGLE PRINT

(75) Inventor: Roger A. Fields, Pittsford, NY (US)

(73) Assignee: Eastman Kodak Company, Rochester, NY (US)

(*) Notice: Subject to any disclaimer, the term of this patent is extended or adjusted under 35 U.S.C. 154(b) by 77 days.

(21) Appl. No.: 09/629,506

(22) Filed: Aug. 1, 2000

(51) Int. Cl.[7] .......................... G03B 17/02; G03B 17/24
(52) U.S. Cl. ......................... 396/311; 396/374; 348/64; 348/333.01
(58) Field of Search ................................. 396/311, 374, 396/429; 348/64, 333.02, 333.05, 333.11, 333.12, 231, 232, 233, 333.01

(56) References Cited

U.S. PATENT DOCUMENTS

| | | | | |
|---|---|---|---|---|
| 4,456,931 A | * | 6/1984 | Toyoda et al. | 348/233 X |
| 5,534,956 A | * | 7/1996 | Iwashita et al. | 396/311 |
| 5,587,752 A | | 12/1996 | Petruchik | 396/315 |
| 6,014,165 A | | 1/2000 | McIntyre et al. | 348/64 |
| 6,072,962 A | | 6/2000 | Parulski | 396/311 |

* cited by examiner

Primary Examiner—W. B. Perkey
(74) Attorney, Agent, or Firm—Roger A. Fields

(57) ABSTRACT

A dual image capture camera for capturing successive film images and electronic images that correspond to the respective film images has an image-combining selector capable of being manually operated to select an identical print designation for at least two captured film images which indicates that these captured film images should be combined to make a single print, and a display that shows the captured electronic images to permit one to view them in order to decide which captured film images are to be combined to make a single print.

10 Claims, 6 Drawing Sheets

DUAL FILM IMAGE AND ELECTRONIC IMAGE CAPTURE CAMERA CAPABLE OF SELECTING FILM IMAGES TO BE COMBINED IN A SINGLE PRINT

FIELD OF THE INVENTION

The invention relates generally to the field of cameras, and in particular a dual film image and electronic image capture camera capable of selecting film images to be combined in a single print.

BACKGROUND OF THE INVENTION

Recently, a dual image capture (or hybrid) camera has been proposed for substantially simultaneously capturing a film image of a subject being photographed and an electronic image of the subject. The camera includes a film image capture or taking lens, an electronic image capture lens, and an image display that shows a captured electronic image of the subject which corresponds to a captured film image of the subject. The displayed electronic image permits one to verify they got the captured film image they wanted.

SUMMARY OF THE INVENTION

A dual image capture camera for capturing successive film images and electronic images that correspond to the respective film images comprises:

an image-combining selector capable of being manually operated to select an identical print designation for at least two captured film images which indicates that these captured film images should be combined to make a single print; and a display that shows the captured electronic images to permit one to view them in order to decide which captured film images are to be combined to make a single print.

DETAILED DESCRIPTION OF THE INVENTION

The invention is disclosed as being embodied preferably in a motorized film advance camera for substantially simultaneously capturing a film image of a subject being photographed and an electronic image of the subject. Because the features of a motorized film advance camera are generally known, the description which follows is directed in particular only to those elements forming part of or cooperating directly with the disclosed embodiment. It is to be understood, however, that other elements may take various forms known to a person of ordinary skill in the art.

Figure 1:
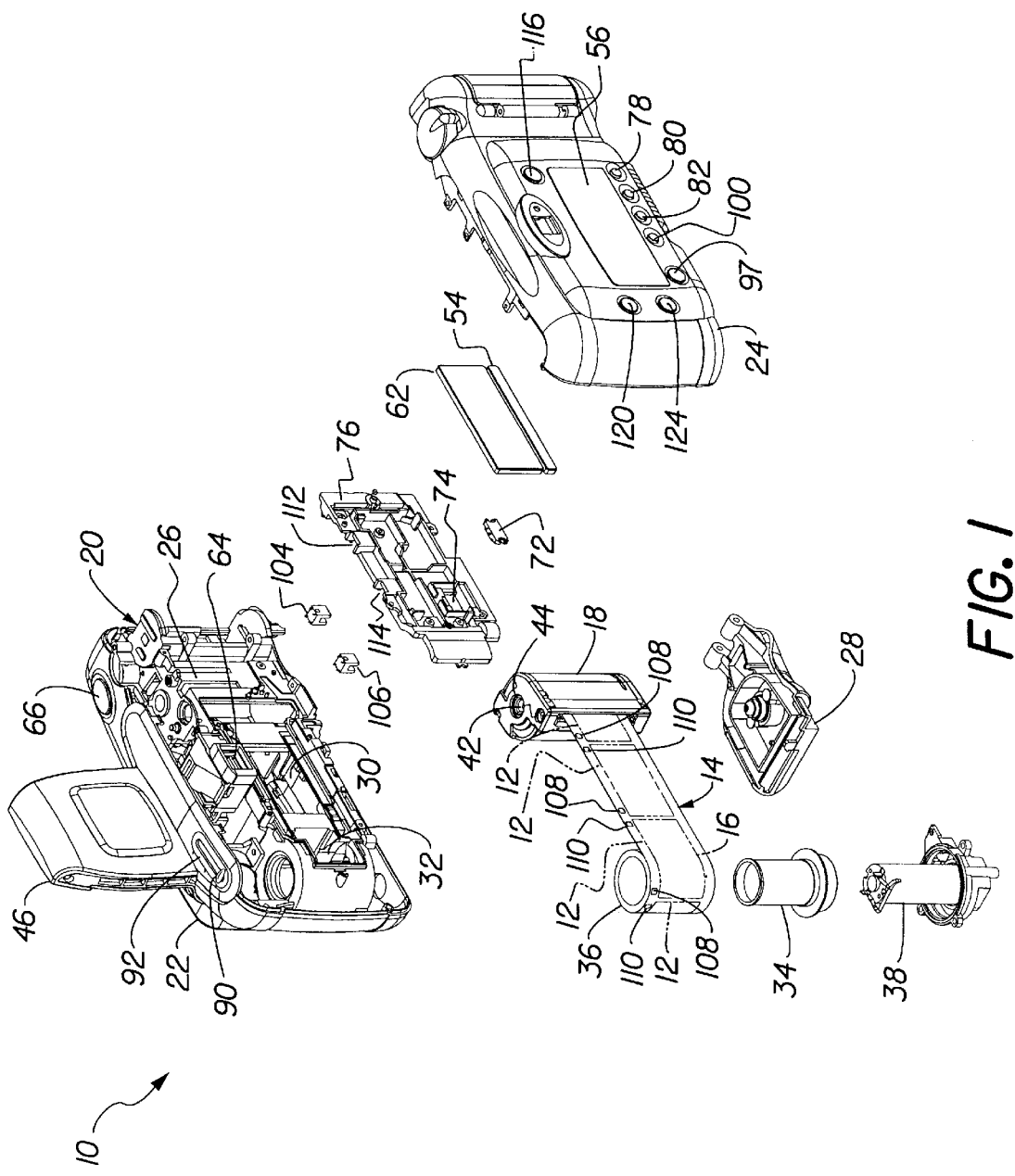
FIG. 1 is a rear exploded perspective view of a dual film image and electronic image capture camera according to a preferred embodiment of the invention.
Figure 2:
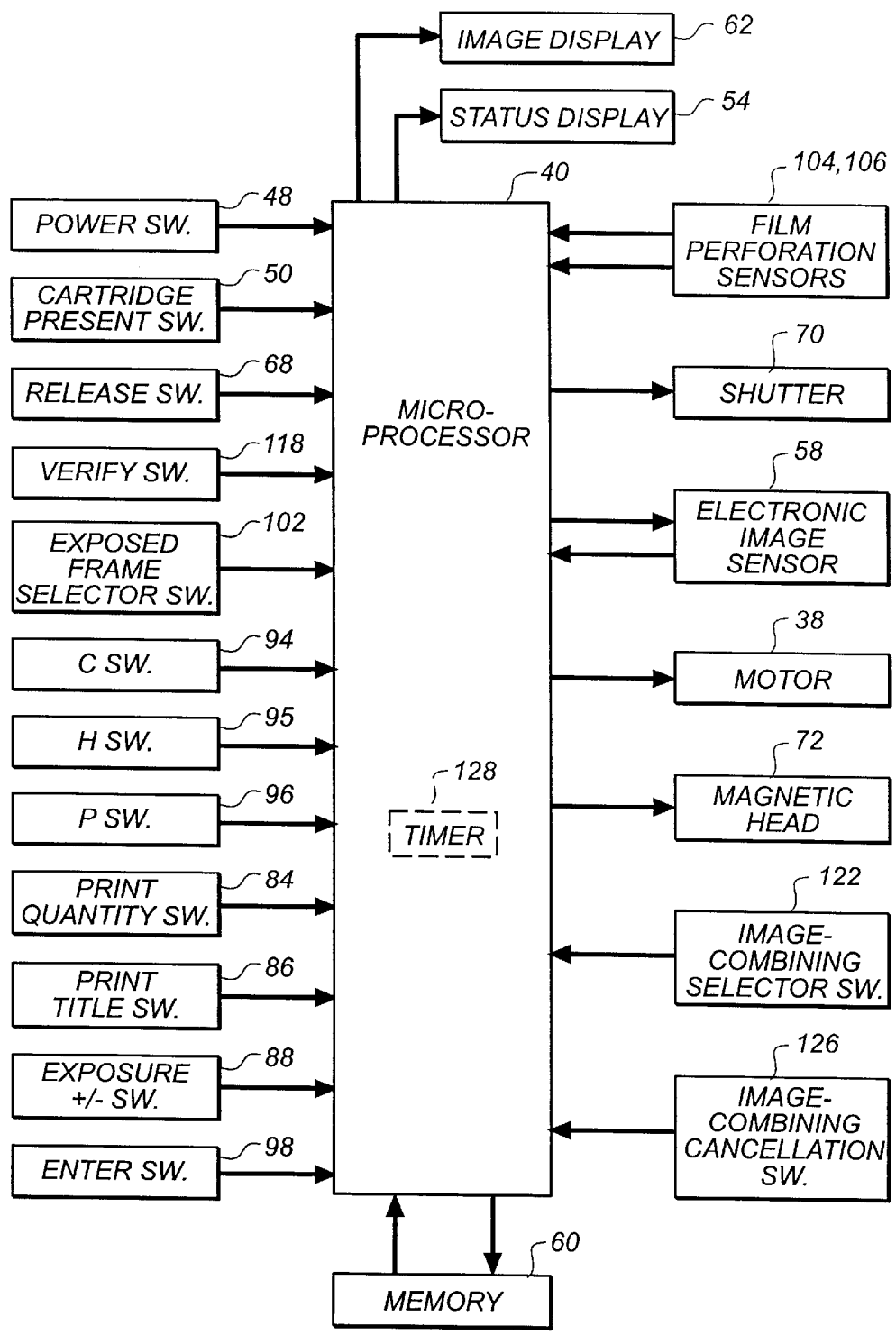
FIG. 2 is a block diagram of various components of the camera.

Referring now to the drawings, FIGS. 1 and 2 show a motorized film advance camera 10 for exposing latent images of a subject being photographed, i.e. capturing film images, of the subject, on successive frames 12 of a known "Advanced Photo System" ("APS") filmstrip 14. The filmstrip 14 has a transparent magnetic overlay which gives it a magnetic recording capacity to store various user-selected information (subsequently described) along a track 16 adjacent each exposed film frame 12, and it is normally housed in an opaque film cartridge 18. Typically, the "APS" filmstrip 14 is available in 15-exposure, 25-exposure, and 40-exposure lengths, and the user-selected information can differ from frame-to-frame.

The camera 10 has an opaque main body part 20 that is housed between a pair of connected opaque front and rear cover parts 22 and 24. See FIG. 1. The main body part 20 has a cartridge receiving chamber 26 for receiving the film cartridge 18 through a bottom opening (not shown) when a bottom door 28 is pivoted open, a rearwardly open backframe opening 30 at which the respective frames 12 of the filmstrip 14 are temporarily positioned one at a time to be exposed, and an exposed film take-up chamber 32 that contains a film take-up spool 34. The film take-up spool 34 is incrementally rotated following each film exposure, i.e. each film image capture, to wind the most-recently exposed one of the film frames 12 onto an exposed film roll 36 on the spool and to position a fresh unexposed film frame at the backframe opening 30. When the film take-up spool 34 is incrementally rotated, the filmstrip 14 is advanced forward one frame increment (which is slightly greater than a frame width) from the film cartridge 18. A drive motor 38 resides inside the film take-up spool 34 for incrementally rotating the spool to advance the filmstrip 14 forward one frame increment, and its operation is controlled by a known microcomputer or control 40 having a built-in microprocessor. See FIG. 2. When substantially the entire length of the filmstrip 14 is exposed, i.e. the total number of available frames 12 are exposed, a spindle (not shown) which projects into a cavity 42 in a top end 44 of a film spool inside the film cartridge 18 is continuously rotated via the motor 38 and a suitable gear train (not shown) to rewind the exposed film length rearward into the film cartridge.

To magnetically record the user-selected information along the track 16 adjacent each exposed film frame 12, the motor 38 must be actuated after the exposed film length is rewound rearward into the film cartridge 18 to continuously rotate the film take-up spool 34 in order to re-advance the exposed film length out of the film cartridge. Then, the motor 38 is actuated after the information recording to continuously rotate the film spool inside the film cartridge 18 in order to rewind the film length with the recorded information rearward into the film cartridge. Finally, the door 28 is pivoted open to remove the film cartridge 18 from the cartridge receiving chamber 26.

A known electronic flash unit 46 for flash assisted exposures is flipped up from partially covering the front cover part 22 to uncover a known film image capture or taking lens (not shown), preparatory to using the camera 10. See FIG. 1. Flipping up the flash unit 46 closes a normally open power switch 48 connected to the microcomputer 40 to electrically power "on" the camera 10. See FIG. 2.

A normally open cartridge present switch 50 in the cartridge receiving chamber 26 and connected to the microcomputer 40 is closed when the film cartridge 18 is present in the chamber and the door 28 is closed. See FIG. 2.

Figure 3:
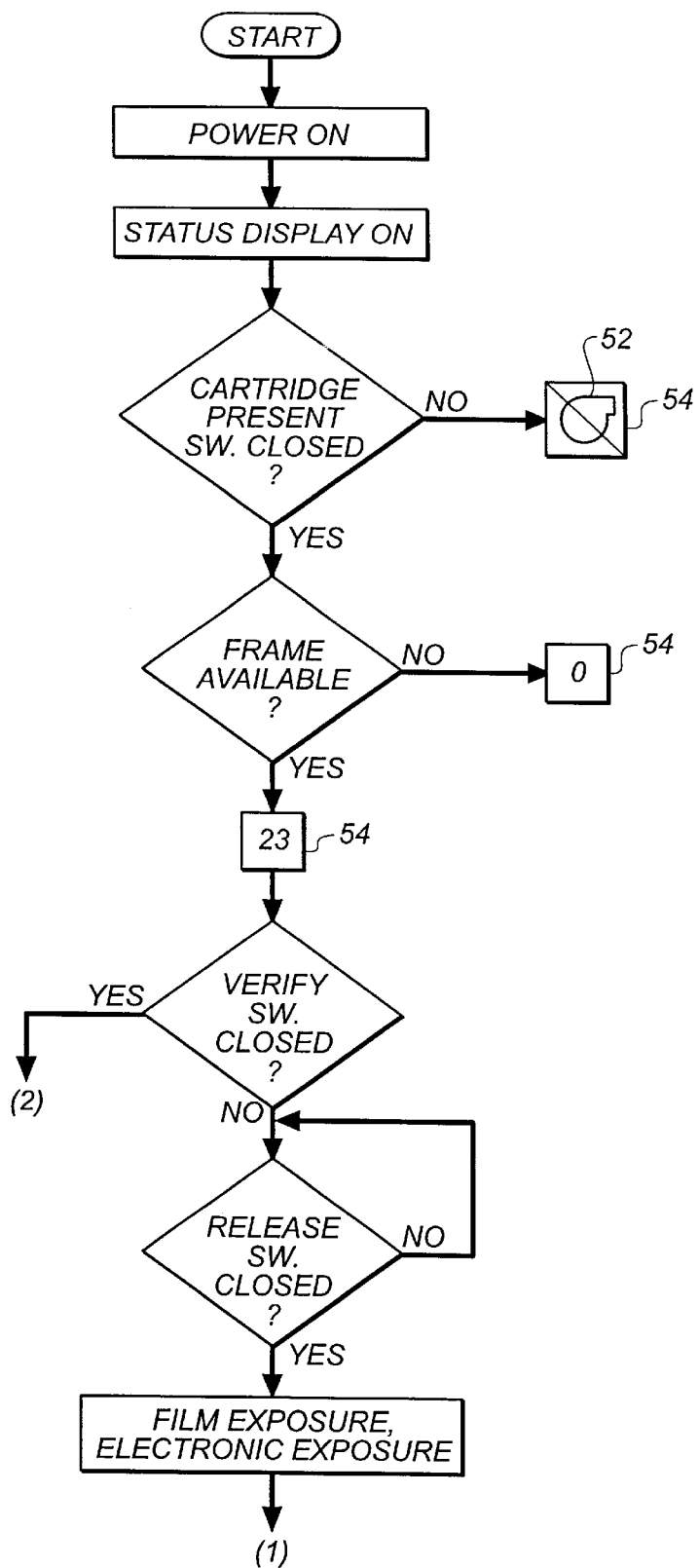
FIGS. 3–5 and 6 are charts depicting operation of the camera.

If the camera 10 is powered "on" and the cartridge present switch 50 is open, a visible no-cartridge warning 52 shown in FIG. 3 is shown in a known status display 54 such as a black and white LCD connected to the microcomputer 40. The status display 54 is turned "on" when the power switch 48 is closed, and it is located behind a window 56 in the rear cover part 24. See FIG. 1. If the camera 10 is powered "on" and the cartridge present switch 50 is closed, a visible cartridge loaded indication (not shown) is shown in the status display 54.

A known electronic image sensor 58, for example a CCD sensor with integrated shuttering capability or a CMOS sensor with integrated shuttering capability, is fixed behind a known electronic image capture lens, lens (not shown).

Flipping up the electronic flash unit 46 uncovers the electronic image capture lens. The electronic image sensor 58 is connected to the microcomputer 40 and forms a different electronic image of the subject, to provide electronic image capture of the subject, each time one of the unexposed film frames 12 is exposed. The captured electronic images correspond to the respective latent images on the exposed film frames 12, are individually stored in a memory 60 connected to the microcomputer 40 each time the filmstrip 14 is advanced forward one frame increment (following a film exposure), and can be shown at least one at a time in a known image display 62 such as a color LCD connected to the microcomputer. The image display 62 is located next to the status display 54, behind the window 56 in the rear cover part 24. The memory 60 has storage capacity for storing at least 40 captured electronic images, since the filmstrip 14 is available in 15-exposure, 25-exposure, and 40-exposure lengths. See FIGS. 1 and 2.

A known viewfinder 64 for viewing the subject (before it is photographed) is located on the main body part 20. See FIG. 1.

To take a picture of the subject, a shutter release button 66 on the front cover part 22 is manually depressed which in turn closes a normally open release switch 68 connected to the microcomputer 40. See FIGS. 1 and 2. The closed release switch 68 triggers momentary opening of a known normally closed shutter 70 to expose a latent image of the subject on the film frame 12 at the backframe opening 30, and to excite the electronic image sensor 58 to form an electronic image of the subject substantially simultaneously with exposure of the latent image.

A magnetic head 72 is mounted within an opening 74 in a film pressure platen 76 for magnetically recording the user-selected information along the track 16 adjacent each one of the exposed film frames 12. The film pressure platen 76 serves to support each film frame 12 flat for exposure at the backframe opening 30.

The user-selected information for each one of the exposed film frames 12 includes a print title (optional) in English or other language, a print exposure correction +/– (optional), any one of three known "APS" print formats "C" (classic), "H" (HDTV) and "P" (panoramic), and C-, H- and P- print quantity numbers preferably ranging from 0–9 prints (to indicate 1, 2, 3, 4, 5, 6, 7, 8, 9, or 0 prints),. This allows "C" and/or "H" and/or "P" print formats (seven different possible choices) to be selected for any one of the exposed film frames 12, and it allows a corresponding C-, H- or P- print quantity number 0–9 to be selected for each one of the "C", "H" and "P" print formats that have been selected for the same exposed film frame. For example, for a particular one of the exposed film frames 12, the print quantity and print format selections can be two "C" format prints, one "H" format print, and no (zero) "P" format prints.

A print having a "C" format is typically 4 (height) ×6 (width) inches. A print having a "H" format is typically 4 (height) ×7 (width) inches. A print having a "P" format is typically 4 (height) ×10 (width) inches or 4 (height) ×11.5 9 (width) inches. No matter which one(s) of the print formats is (are) selected, "C", and/or "H" and/or "P", the exposed frames 12 on the filmstrip 14 are always in the "H" format. As is known, this allows re-prints to be made in any of the three formats rather than just in the selected format.

The selected print title, print exposure correction, "C" and/or "H" and/or "P" print format(s), and C- and/or H- and/or P- print quantity number(s) for every one of the exposed film frames 12 are stored as corresponding designations or assignments in the memory 60 for the respective film frames. In practice, a selected print title, print exposure correction, "C" and/or "H" and/or "P" print format(s), and C- and/or H- and/or P- print quantity number(s) for the most-recently exposed one of the film frames 12 is stored in the memory 60 each time the filmstrip 14 is advanced forward one frame increment (following a film exposure).

Individual visible indications of the selected print title, print exposure correction, and C- and/or H- and/or P- print quantity number(s) for any one of the exposed film frames 12 can be seen in the status display 54. Also, a visible indication of the selected "C" and/or "H" and/or "P" print format(s) for any one of the exposed film frames 12 can be seen in the image display 62 (preferably with the selected "C" and/or "H" and/or "P" print format(s) superimposed on the captured electronic image shown in the image display). When more than one of the "C", "H" and "P" print formats have been selected for any one of the exposed film frames 12, the visible indications of the selected print formats can be seen together, or alternatively they can be seen one at a time, in the image display 62.

Respective print quantity, title and exposure correction input buttons 78, 80 and 82 are provided on the rear cover part 24, and when individually manually depressed one or more times close normally open print quantity, title and exposure correction switches 84, 86 and 88 the same number of times. See FIGS. 1 and 2. The print quantity, title and exposure correction switches 84, 86 and 88 are connected to the microcomputer 40 to permit the selected C- and/or H- and/or P- print quantity number(s), title and exposure correction to be stored as designations or assignments to the memory 60 for a most-recently exposed one of the film frames 12 each time the filmstrip 14 is advanced forward one frame increment (following a film exposure), and to change the C- and/or H- and/or P- print quantity number(s), title and exposure correction stored in the memory 60 for any one of the exposed film frames 12 (including the most-recently exposed film frame) any time. A three-position print format selection/input button 90 is supported on a top plate 92 for manual movement into any one of three C-, H- and P- print format selection positions, and when manually depressed once in any one of the three positions closes a corresponding one of three normally open C, H and P switches 94, 95 and 96 once. The C, H and P switches 94, 95 and 96 are individually connected to the microcomputer 40 to permit the "C" and/or "H" and/or "P" print format(s) to be stored as designations or assignments to the memory 60 for a most-recently exposed one of the film frames 12 each time the filmstrip 14 is advanced forward one frame increment (following a film exposure), and to change "C" and/or "H" and/or "P" print format(s) stored in the memory 60 for any one of the exposed film frames 12 (including the most-recently exposed film frame) any time. To store the newly selected information in the memory 60, an enter button 97 on the rear cover part 24 must be manually depressed which in turn closes a normally open enter switch 98 connected to the microcomputer 40.

The three-position print format selection/input button 90 remains in the last-used one of its three C-, H- and P- print format selection positions until such time as it is manually moved to another one of its three positions, i.e. the button does not default via a spring-urging to any one of the three positions. Although not shown, manual movement of the print format selection/input position button 90 to any one of its three C-, H- and P- print format selection positions can serve to adjust a known variable print format mask in the viewfinder 64 to view the subject to be photographed in a viewing format that matches the position of the button.

If the print quantity input switch 84 is not closed one-to-ten times (to designate a print quantity number to be 1, 2, 3, 4, 5, 6, 7, 8, 9, or 0 prints) for a particular one of the selected "C", "H" or "P" print formats, a default print quantity number for that one selected print format is "1". The default print quantity number can be stored at a library address in the memory 60.

An exposed frame (image-viewing) selector button 100 is provided on the rear cover part 24, and when manually depressed one or more times closes a normally open exposed frame selector switch 102 connected to the microcomputer 40 the same number of times, to change the captured electronic image and the "C", and/or "H" and/or "P" print format(s) shown in the image display 62 for any one of the exposed film frames 12, and to change the C- and/or H- and/or P- print quantity number(s), print title, and print exposure correction shown in the status display 54 for the same exposed film frame, to the captured electronic image and the user-selected information for another one of the exposed film frames. This is possible because the captured electronic images that correspond to the exposed film frames, and the user-selected information for the exposed film frames, are stored in the memory 60. Thus, one can effectively scroll through the captured electronic images and the user-selected information stored in the memory 60 for the exposed film frames 12, and successively see the captured electronic images and the user-selected information for any one of the exposed film frames in the image and status displays 62 and 54. This is done in preparation for manually depressing the print quantity, title and exposure correction input buttons 78, 80 and 82 and the print format selection/input button 90 to change the user-selected information stored in the memory 60 for any one of the exposed film frames 12 (when the enter button 97 is manually depressed).

A pair of identical film perforation sensors 104 and 106 for sensing successive pairs of film perforations 108 and 110 in the filmstrip 14 are mounted in respective pockets 112 and 114 in the film pressure platen 76 and are connected to the microcomputer 40. The film perforation sensors 104 and 106, as is known, are used via the microcomputer 40 to decrement a frame count (the number of available film frames 12) stored in the memory 60 by "1". The decrement occurs each time the filmstrip 14 is advanced forward a frame increment (following a film exposure). The frame count begins with "15", "25" or "40" depending on whether the filmstrip 40 has a 15-exposure, 25-exposure, or 40-exposure length, and it is shown in the status display 54. Consistent with the frame count, respective frame numbers for the captured electronic image can be stored in the memory 60.

A verify (print preview) button 116 is provided on the rear cover part 24, and when manually depressed closes a normally open verify switch 118 connected to the microcomputer 40. See FIGS. 1 and 2. The closed verify switch 118 causes the captured electronic image and the "C" and/or "H" and/or "P" print format(s) stored in the memory 60 for the most-recently exposed one of the film frames 12 to be shown in the image display 62, and it causes the C- and/or H- and/or P- print quantity number(s), print title, and print exposure correction stored in the memory for the same exposed film frame to be shown in the status display 54. If, however the exposed frame selector switch 102 had been closed to change the electronic image and the "C" and/or "H" and/or "P" print format(s) shown in the image display 62 and to change C- and/or H- and/or P- the print quantity number(s), print title, and print exposure correction shown in the status display 54, from that for the most-recently exposed one of the film frames 12 to that for an earlier exposed one of the film frames, then the closed verify switch 118 causes the captured electronic image and the user-selected information for the earlier exposed film frame to be shown in the displays.

Selecting at Least Two Exposed Film Frames 12 to Make a Single Print

The user-selected information can further include at least one of a series of distinguishable print designations (e.g. P-1, P-2, P-3, etc.) that are initially stored at an original storage address in the memory 60. Any one of the print designations is used to indicate that at least two of the exposed frame frames 12 are to be combined during photofinishing to make a single print. The combining of at least two exposed film frames 12 to make a single print during photofinishing can be done by known high resolution digital scanning of the processed negatives (made from the exposed film frames) to provide digital images, and then by known digitally editing of the digital images to make a single print. See incorporated prior art U.S. Pat. No. 6,014,165 issued Jan. 11, 2000.

Each time one views a captured electronic image in the image display 62, an image-combining selector button 120 provided on the rear cover part 24 can be manually depressed to close a normally open image-combining selector switch 122. See FIGS. 1 and 2. The captured electronic image shown in the image display 62 can correspond to a most-recently exposed one of the film frames 12 or alternatively to an earlier exposed film frame. The image-combining switch 122 is connected to the microcomputer 40 to permit the next-available print designation at the original storage address in the memory 60 to be selected for at least two of the exposed film frames 12. The image-combining selector button 120 must be manually depressed each time one of the captured electronic images corresponding to the respective film frames 12 that are to be combined to make a single print is shown in the image display 62. This is done to tag each electronic image with an identical (the same) print designation. Then, the enter button 98 must be manually depressed to close the enter switch 98 in order to assign each electronic image together with an identical print designation tagged to them to a temporary holding address in the memory 60. The print designation tagged to the electronic images is removed from the original storage address in the memory 60 to allow the print designation next available at that address to be subsequently selected.

The image display 62 will show a print designation that is assigned to the temporary holding address in the memory 60 for at least two of the exposed film images 12 when the image display shows a captured electronic image corresponding to any one of these exposed film frames, because the print designation is tagged to the electronic image.

An image-combining cancellation button 124 is provided in the rear cover part 24 and when manually depressed closes a normally open image-combining cancellation switch 126. The image-combining cancellation button 126 is connected to the microcomputer 40 to return a print designation from the temporary address to the original address in the memory 60. Thus, assignment of a print designation for at least two exposed film frames 12 to the temporary storage address in the memory 60 can be cancelled when the image display 60 shows a captured electronic image corresponding to any one of these exposed film frames and the image-combining cancellation switch 126 is closed.

The magnetic head 72 records a print designation which is selected for at least two exposed film frames 12 along the track 16 adjacent each of these film frames.

Operation

Figure 4:
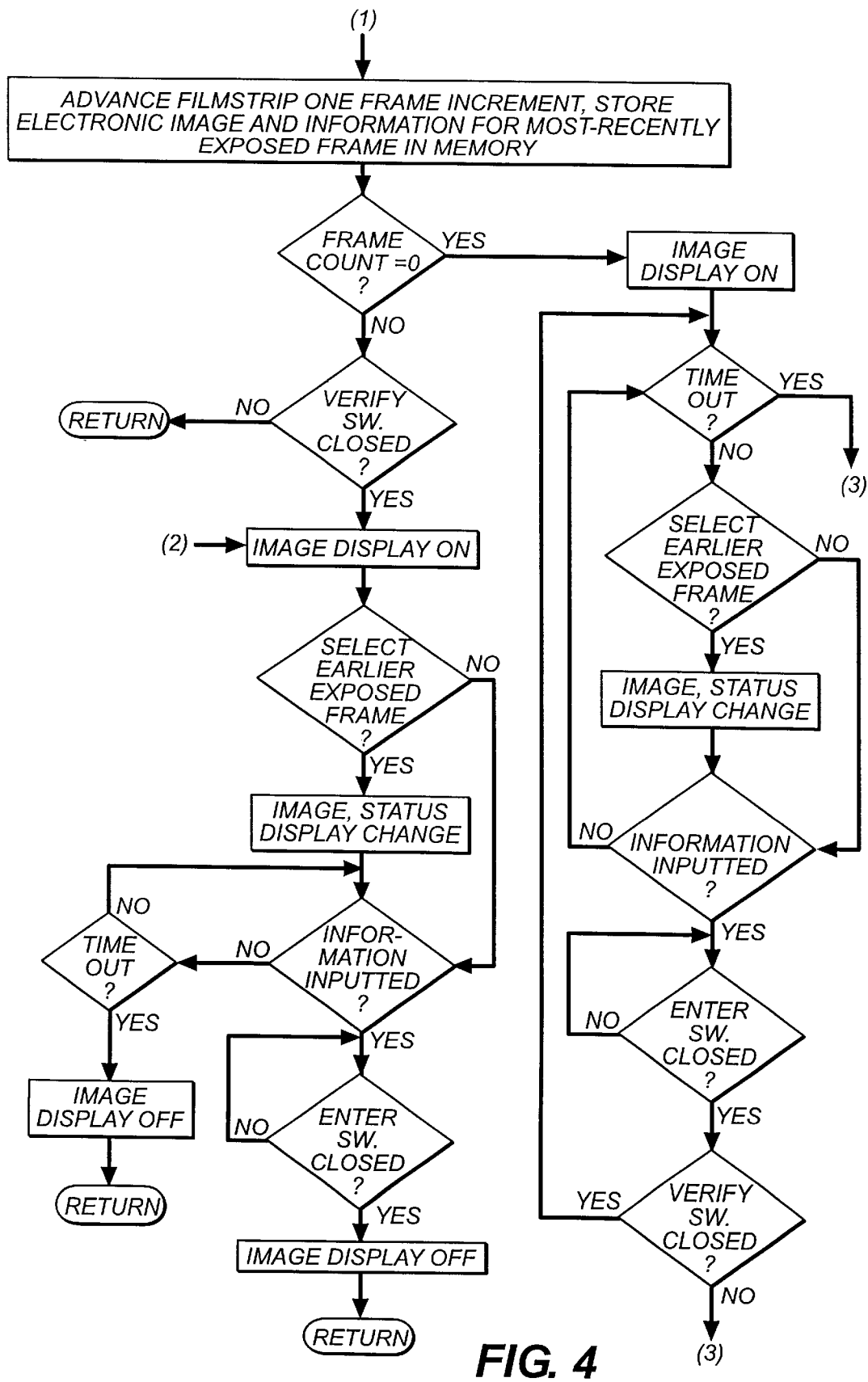
Figure 5:
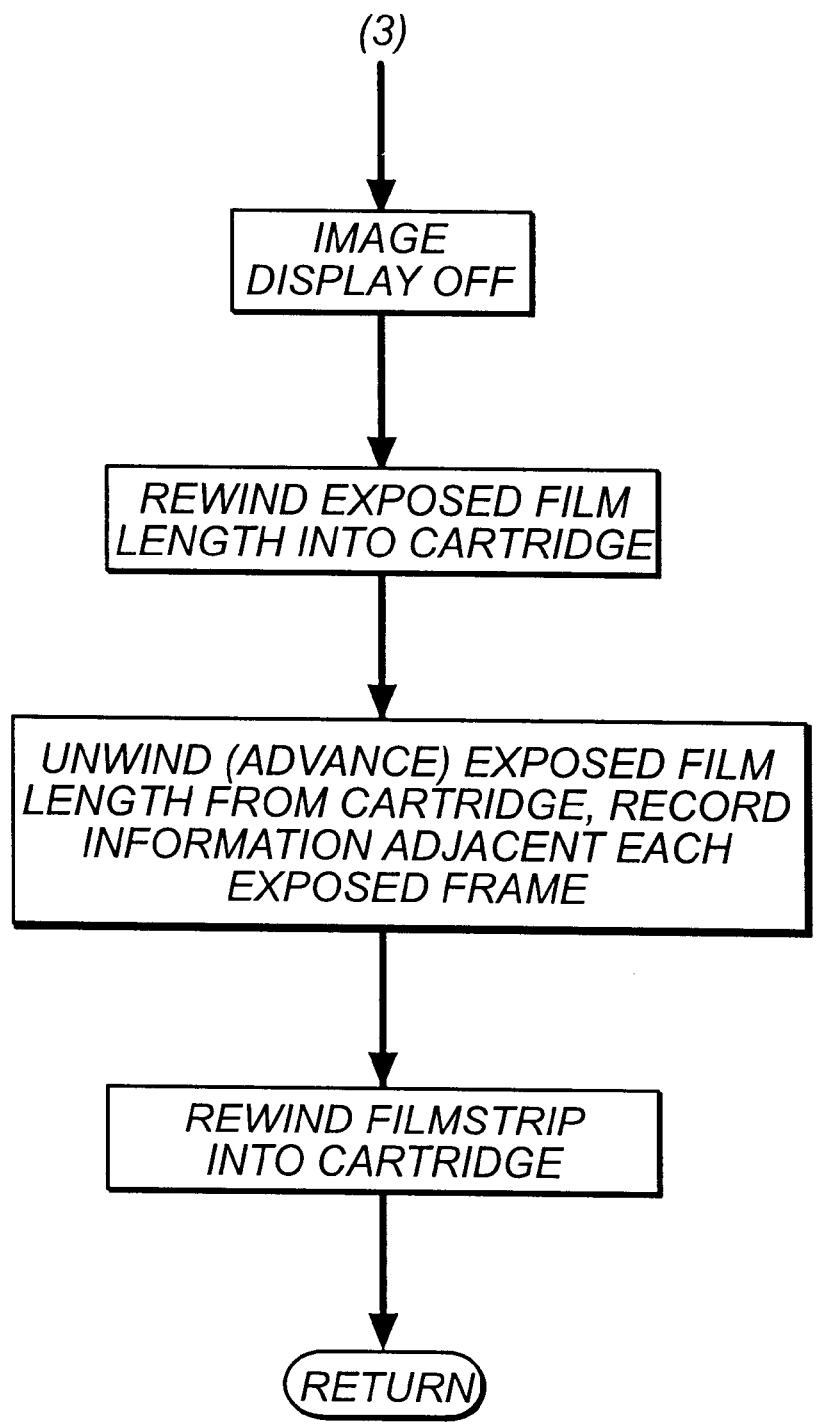

The main operation of the camera 10 is shown in a flow chart in FIGS. 3–5.

1. Starting at FIG. 3, when the camera 10 is electrically powered "on" by flipping up the electronic flash unit 46, the status display 54 is simultaneously turned "on." The status display 54 shows, among other things, the frame count (the number of available film frames 12) stored in the memory 60.

2. If then in FIG. 3 the cartridge present switch 50 remains open because no film cartridge 18 is present in the cartridge receiving chamber 26, the no-cartridge warning 52 is provided in the status display 54.

3. If conversely in FIG. 3 the cartridge present switch 50 is closed because the film cartridge 18 is present in the cartridge receiving chamber 26, the memory 60 is interrogated to determine whether the frame count is greater than "0".

4. If then in FIG. 3 the frame count in the memory 60 is "0", which indicates that the final available one of the film frames 12 has been exposed, i.e. there are no film frames remaining for exposure, the number "0" appears in the status indicator 54.

5. If conversely in FIG. 3 the frame count in the memory 60 is greater than "0", for example "23", which indicates that there are twenty-three film frames 12 available for exposure, the number "23" appears in the status indicator 54.

6. If next in FIG. 3 the verify switch 118 is closed, the image display 62 is turned "on" in FIG. 4 to show the electronic image stored in the memory 60 corresponding to the latent image on the most-recently exposed one (or alternatively on an earlier exposed one) of the film frames 12. Also, the status display 54 now shows the user-selected information stored in the memory 60 for the same exposed film frame, except that the visible indication of the selected "C" and/or "H" and/or "P" print format(s) for that exposed film frame is shown in the image display 62 superimposed on the electronic image.

7. If conversely in FIG. 3, the verify switch 118 remains open, and the release switch 68 is not closed within an allotted time, e.g. 150 seconds, determined by a timer 128 in the microcomputer 40, the camera 10 is powered "off" for battery conservation.

8. If conversely in FIG. 3, the verify switch 118 remains open, and the release switch 68 is closed within the allotted time, e.g. 150 seconds, determined by the timer 128 in the microcomputer 40, because a picture of the subject is being taken, a latent image of the subject is exposed on the film frame 12 at the backframe opening 30 and the electronic image sensor 58 is excited to form a captured electronic image of the subject which corresponds to the latent image on the newly exposed frame.

9. Then in FIG. 4 the motor 38 is actuated to incrementally rotate the film take-up spool 34 in order to advance the filmstrip 14 forward a frame increment and wind the most-recently exposed one of the film frames 12 onto the exposed film roll 36 on the spool. Also, the electronic image corresponding to the latent image on the most-recently exposed frame 12 and the user-selected information for the most-recently exposed frame are stored in the memory 60, and the frame count stored in the memory is decremented by "1", for example to "22."

10. If next in FIG. 4 the frame count in the memory 60 is greater than "0", the verify switch 114 can be closed.

11. If then in FIG. 4 the verify switch 118 is not closed within the allotted time, e.g. 150 seconds, determined by the timer 128 in the microcomputer 40, or alternatively the final release switch 68 is not closed within the same time, the camera 10 is powered "off" for battery conservation.

12. If conversely in FIG. 4 the verify switch 118 is closed within the allotted time (as in FIG. 3), e.g. 150 seconds, determined by the timer 128 in the microcomputer 40, the image display 62 is turned "on" to show the electronic image stored in the memory 60 corresponding to the latent image on the most-recently exposed one (or alternatively on an earlier exposed one) of the film frames 12. Also, the status display 54 now shows the user-selected information for the same exposed film frame, except that the visible indication of the selected "C" and/or "H" and/or "P" print format(s) is shown in the image display 62 superimposed on the electronic image.

13. If next in FIG. 4 the exposed frame selector switch 102 is not closed within the allotted time, e.g. 150 seconds, determined by the timer 128 in the microcomputer 40, and none of the user-selected information switches 84, 86, 88 and 94–96 are closed within a brief time, e.g. 10 seconds, determined by the timer, the image display 62 is turned "off". The camera 10 including the status display 54 remains "on."

14. If conversely in FIG. 4 the exposed frame selector switch 102 is not closed within the allotted time, e.g. 150 seconds, determined by the timer 128 in the microcomputer 40, and at least one of the user-selected information switches 84, 86, 88 and 94–96 is closed within the brief time, e.g. 10 seconds, determined by the timer, then when the enter switch 98 is closed, the image display 62 is turned "off", and the electronic image and the new selected information for the most-recently exposed one of the film frames 12 are stored in the memory 60 in place of the previously stored information for the same exposed film frame.

15. If alternatively in FIG. 4 the exposed frame selector switch 102 is closed within the allotted time, e.g. 150 seconds, the electronic image and the user-selected information stored in the memory 60 for any one of the earlier exposed film frames (not the most-recently exposed film frame) are shown in the status and image displays 54 and 62 in place of the previously shown image and information for another one of the exposed film frames. Then, when at least one of the user-selected information switches 84, 86, 88 and 94–96 is closed within the brief time, e.g. 10 seconds, and the enter switch 98 is closed, the image display 62 is turned "off", and the electronic image and the new selected information for the earlier exposed film frame 12 are stored in the memory 60 in place of the previously stored information for the same exposed film frame.

16. If in FIG. 4 the frame count in the memory 60 is "0", the image display 62 is turned "on" to show the electronic image stored in the memory 60 corresponding to the latent image on the final exposed one of the film frames 12. Also, the status display 54 now shows the user-selected information for the same exposed film frame, except that the visible indication of the selected "C" and/or "H" and/or "P" print format(s) is shown in the image display 62 superimposed on the electronic image. The image display 62 is turned "on" in this instance (as compared with the other instance in FIG. 4 that it is turned "on"without having to first close the verify switch 118.

17. If next in FIG. 4, the unexposed frame selector switch 102 is not closed within the allotted time, e.g. 150 seconds, and none of the user-selected information switches 84, 86, 88 and 94–96 are closed within a brief time, e.g. 10 seconds, the image display is turned "off" as indicated in FIG. 5, and the motor 38 is actuated to continuously rotate the film spool inside the film cartridge 18 in order to rewind the exposed film length rearward into the cartridge. Then, the motor 38 is actuated to continuously rotate the film take-up spool 34 in order to advance the exposed film length out of the film cartridge 18, and the magnetic head 72 magnetically records the user-selected information stored in the memory 60 for each exposed film frame on the exposed film length along the track 16 adjacent each exposed film frame. Then, the motor 38 is actuated to continuously rotate the film spool inside the film cartridge 18 in order to rewind the exposed film length rearward into the cartridge. Finally, the door 28 is pivoted open to remove the film cartridge 18 from the cartridge receiving chamber 26.

18. If conversely in FIG. 4 the unexposed frame selector switch 102 is not closed within the allotted time, e.g. 150 seconds, and at least one of the user-selected information switches 84, 86, 88 and 94–96 is closed within the brief time, e.g. 10 seconds, the image display 62 remains "on." Then when the enter switch 98 is closed and the verify switch 118 is not closed within the allotted time, e.g. 150 seconds, the image display 62 is turned "off" as indicated in FIG. 5, and the motor 38 is actuated to continuously rotate the film spool inside the film cartridge 18 in order to rewind the exposed film length rearward into the cartridge. Then, the motor 38 is actuated to continuously rotate the film take-up spool 34 in order to advance the exposed film length out of the film cartridge 18, and the magnetic head 72 magnetically records the user-selected information stored in the memory 60 for each exposed film frame on the exposed film length along the track 16 adjacent each exposed film frame. Then, the motor 38 is actuated to continuously rotate the film spool inside the film cartridge 18 in order to rewind the exposed film length rearward into the cartridge. Finally, the door 28 is pivoted open to remove the film cartridge 18.

19. If alternatively in FIG. 4 the unexposed frame selector switch 102 is closed within the allotted time, e.g. 150 seconds, the electronic image and the user-selected information stored in the memory 60 for any one of the earlier exposed film frames (not the most-recently exposed film frame) is shown in the status and image displays 54 and 62. Then, when at least one of the user-selected information switches 84, 86, 88 and 94–96 is closed within the brief time, e.g. 10 seconds, and the enter switch 98 is closed, and the verify switch 118 is not closed within the allotted time, e.g. 150 seconds, the image display 62 is turned "off" as indicated in FIG. 5, and the motor 38 is actuated to continuously rotate the film spool inside the film cartridge 18 in order to rewind the exposed film length rearward into the cartridge. Then, the motor 38 is actuated to continuously rotate the film take-up spool 34 in order to advance the exposed film length out of the film cartridge 18, and the magnetic head 72 magnetically records the user-selected information stored in the memory 60 for each exposed film frame on the exposed film length along the track 16 adjacent each exposed film frame. Then, the motor 38 is actuated to continuously rotate the film spool inside the film cartridge 18 in order to rewind the exposed film length rearward into the cartridge. Finally, the door 28 is pivoted open to remove the film cartridge 18.

20. If conversely in FIG. 4 the verify switch 118 is closed within the allotted time, e.g. 150 seconds, go back to step 17 above.

Figure 6:
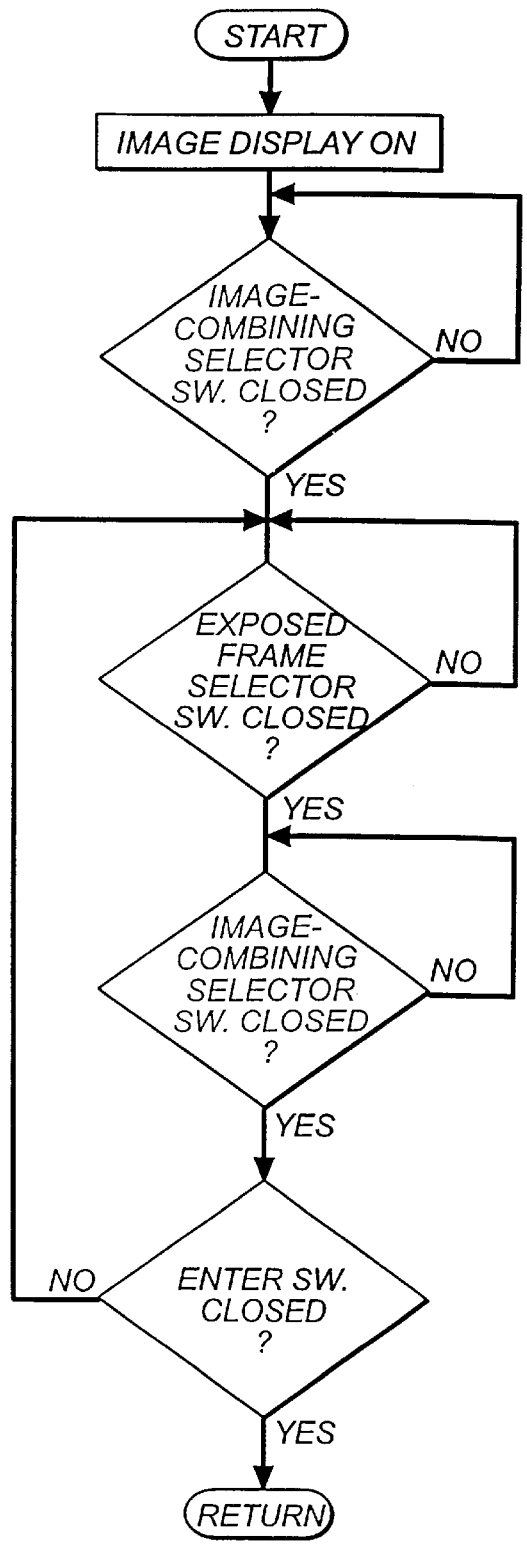

Selecting Exposed Film Frames 12 to Make a Single Print Sub-Routine (FIG. 6)

1. This sub-routine begins with the image display 62 turned "on" and a captured electronic image corresponding to a most-recently exposed one of the film frames 12 or alternatively to an earlier exposed film frame is shown in the image display.

2. Next, the image combining selector switch 122 is closed to tag the electronic image shown in the image display 62 with the next-available print designation at the original storage address in the memory 60.

3. Then, the exposed frame selector switch 102 is closed to change the captured electronic image shown in the image display 62 to another captured electronic image.

4. Next, the image combining selector switch 122 is closed to tag the electronic image shown in the image display 62 with the same print designation as in step 2.

5. Steps 3 and 4 are repeated until the enter switch 98 is closed.

The invention is disclosed as being embodied preferably in a motorized film advance camera. Because the features of a motorized film advance camera are generally known, the description which follows is directed in particular only to those elements forming part of or cooperating directly with the disclosed embodiment. It is to be understood, however, that other elements may take various forms known to a person of ordinary skill in the art.

PARTS LIST 10. camera
12. film frames
14. filmstrip
16. track
18. film cartridge
20. main body part
22. front over part
24. rear cover part
26. cartridge receiving chamber
28. bottom door
30. backframe opening
32. exposed film take-up chamber
34. film take-up spool
36. exposed film roll
38. drive motor
40. microcomputer
42. spool cavity
44. spool end
46. electronic flash unit
48. power switch
50. cartridge present switch
52. no-cartridge warning
54. status display
56. window
58. electronic image sensor
60. memory
62. image display
64. viewfinder
66. shutter release button
68. release switch
70. shutter
72. magnetic head
74. opening
76. film pressure platen
78. print quantity input button
80. print title input button
82. exposure correction input button
84. print quantity input switch
86. print title switch
88. exposure correction switch
90. format selection/input button
92. top plate
94. C switch
95. H switch
96. P switch
97. enter button
98. enter switch
100. exposed frame selector button
102. exposed frame selector switch
104. film perforation sensor
106. film perforation sensor
108. film perforation
110. film perforation
112. pocket
114. pocket
116. verify button
118. verify switch
120 image-combining selector button
122. image-combining selector switch
124. image-combining cancellation switch
126. image-combining cancellation switch
128. timer

What is claimed is:

1. A dual image capture camera for capturing successive film images and electronic images that correspond to the respective film images comprises:

an image-combining selector capable of being manually operated to select an identical print designation for at least two captured film images which indicates that these captured film images should be combined to make a single print; and a display that shows the captured electronic images to permit one to view them in order to decide which captured film images are to be combined to make a single print.

2. A dual image capture camera as recited in claim 1, wherein a memory which stores the captured electronic images corresponding to the respective film images is connected to said display to permit said display to show the captured electronic images and is connected to said image-combining selector to store an identical print designation for at least two captured film images when said image-combining selector has been manually operated to select the identical print designation for these captured film images.

3. A dual image capture camera as recited in claim 2, wherein said display shows an identical print designation that is stored in said memory for at least two captured film images when said display shows a captured electronic image corresponding to any one of these captured film images.

4. A dual image capture camera for capturing successive film images on a filmstrip and electronic images that correspond to the respective film images comprises:

a memory that stores the captured electronic images corresponding to the respective film images;

an image-combining selector connected to said memory and capable of being manually operated to assign to said memory an identical print designation for at least two captured film images which indicates that these captured film images should be combined to make a single print; and a recorder connected to said memory to record an identical print designation which is assigned to said memory for at least two captured film images on the filmstrip adjacent each of these captured film images.

5. A dual image capture camera as recited in claim 4, wherein a display shows the captured electronic images to permit one to view them in order to decide which captured film images are to be combined to make a single print and shows an identical print designation that is assigned to said memory for at least two captured film images when said display shows a captured electronic image corresponding to any one of these captured film images.

6. A dual image capture camera for simultaneously capturing successive film images of a subject on a filmstrip and electronic images of the subject that correspond to the respective film images comprises:

a memory that stores the captured electronic images corresponding to the respective film images;

a display connected to said memory to show the captured electronic images that are stored in said memory;

an image-viewing selector connected to said memory and said display and capable of being manually operated to change a captured electronic image shown in said display to another captured electronic image; and an image-combining selector connected to said memory and said display capable of being manually operated to assign to said memory an identical print designation for at least two captured film images which indicates that these captured film images should be combined to make a single print, when each captured electronic image corresponding to the respective film images to be combined to make a single print is shown in said display.

7. A dual image capture camera as recited in claim 6, wherein a recorder is connected to said memory to record an identical print designation which is assigned to said memory for at least two captured film images on the filmstrip adjacent each of these captured film images.

8. A dual image capture camera as recited in claim 6, wherein an image-combining cancellation is connected to said memory and said display and is capable of being manually operated to cancel assignment of an identical print designation to said memory for at least two captured film images when said display shows a captured electronic image corresponding to any one of these captured film images.

9. A method in a dual image capture camera that captures successive film images on a filmstrip and electronic images corresponding to the respective film images, of designating captured film images to be combined to make a single print, comprises the steps of:

showing captured electronic images corresponding to captured film images in a display to permit one to view captured electronic images in order to decide which film images are to be combined to make a single print; and assigning an identical print designation for at least two captured film images which indicates that these captured film images should be combined to make a single print, when each captured electronic image corresponding to the respective film images to be combined to make a single print is shown in the display.

10. A method as recited in claim 9, further comprising the step of:

recording an identical print designation which is assigned for at least two captured film images on the filmstrip adjacent each of these captured film images.

* * * * *